June 2, 1970  J. G. McARTHUR  3,515,117
PORTABLE HEATING DEVICE
Filed May 29, 1968

INVENTOR.
JOHN G. McARTHUR
BY Carl R. Brown
ATTORNEY

3,515,117
PORTABLE HEATING DEVICE

John G. McArthur, San Diego, Calif., assignor to
J. Gene Laboda, San Diego, Calif.
Filed May 29, 1968, Ser. No. 733,097
Int. Cl. A47j *37/07;* F24b *1/26, 3/00*
U.S. Cl. 126—25                                                         9 Claims

ABSTRACT OF THE DISCLOSURE

A portable heating device that supports fuel of the charcoal type for burning in a position before a curved reflecting shield, the combination of which radiates the heat outwardly and upwardly over an expanded area.

BACKGROUND OF THE INVENTION

There is a present existing need for a simple, inexpensive and light weight portable heating device for use in open areas that is capable of generating heat over an area that is large relative to the size of the portable heating device. There are many different types of portable heating devices presently in use. However these heating devices normally employ gas as a fuel or electricity as the power source. Such portable heating devices are limited in their area of use to locations immediately adjacent the sources of fuel or power. Also in using these heating devices in open areas, such as on patios and the like, the majority of the heat generated moves upwardly in the normal direction of rising heated air and thus the heat is not radiated to horizontal areas immediately adjacent the heating device. Electric heaters often employ fans to move the heated air through the coils and into an expanded area adjacent the heater, however the heat generated by such units is usually so small that these units are relatively ineffective for use in open areas. While fuel type heaters that burn wood or other similar type fuels are also known, these heating devices are difficult to make portable, create troublesome smoke, and also do not effectively radiate heat. Charcoal broilers and similar type devices are known and charcoal is capable of providing a very high temperature burning, however the heat from such devices flow directly upand and does not radiate sufficiently to make such devices effective as portable heating devices for use in open areas.

Therefore it would be advantageous to have a portable heating device that is light weight, simple in structure, inexpensive, that burns well known fuel, and yet radiates heat outwardly in an effective manner, whereby a small unit using a relatively small amount of fuel is capable of providing heat for a considerable period of time over a widely expanded open area, such as on patios, near swimming pools, in fire places and at other suitable locations.

SUMMARY OF THE INVENTION

An embodiment of this invention generally comprises a portable heating device that supports fuel of the charcoal type within an open mesh container. The container is positioned in a suitable tray for containing the ash resulting from the burning of the charcoal. Mounted on one side of the tray is a shield having a reflecting surface that is spaced from the container and projects upwardly in a direction parallel with the longitudinal length of the container. The shield has a concave surface that curves around one side of the container with the side edges thereof extending beyond the sides of the container. Handle means are provided for easily carrying the light weight portable heating device to any location and the handle is sufficiently removed from the heat of the burning fuel so that the portable heating device may be moved when the fuel is burning.

The reflecting surface reflects the heat rays outwardly in a direction substantially horizontal and to a slight upward direction over a relative large and expanded area. While the portable heating device of this invention is particularly designed for burning charcoal, it will operate in an effective manner when burning other suitable fuels that do not give off an excessive amount of smoke. The invention is also particularly adapted for simultaneous use as a charcoal cooker and supports skewers for roasting different types of food.

It is therefore an object of this invention to provide a new and improved portable heating device.

It is another object of this invention to provide a new and improved portable heating device that preferably uses charcoal as fuel and radiates heat over an area that is large relative to the size of the portable heating device.

It is another object of this invention to provide a new and improved portable heating device that is particularly advantageous for use in open areas.

It is another object of this invention to provide a new and improved portable heating device that while being capable of radiating heat over a large area, has a handle that is shielded from the heat allowing the portable heating device to be moved while in use.

It is another object of this invention to provide a new and improved portable heating device that is inexpensive, small in size, light weight, rigid, strong, and that employs fuel that does not require any connections to a fuel source.

It is another object of this invention to provide a new and improved portable heating device that is capable of radiating heat over a relatively large area and that may be simultaneously employed as a cooking device.

Other objects and many attendant advantages of this invention will become more apparent upon a reading of the following detailed description and an examination of the drawings wherein like reference characters designate like parts throughout and in which.

Figure 1:
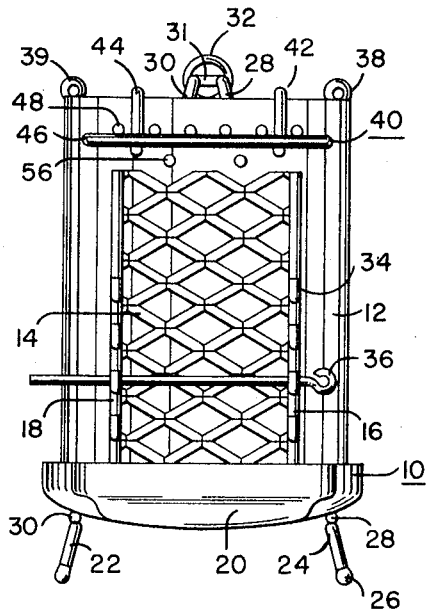
FIG. 1 is a front elevation view of an embodiment of a portable heating device of this invention.
Figure 3:
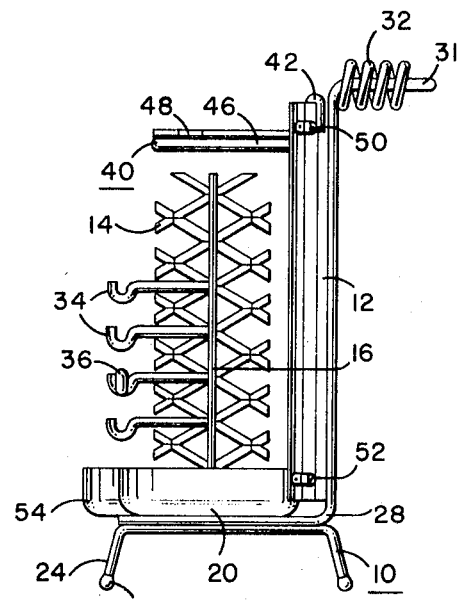
FIG. 3 is a rear elevation view of the portable heating device illustrated in FIGS. 1 and 2.
Figure 2:
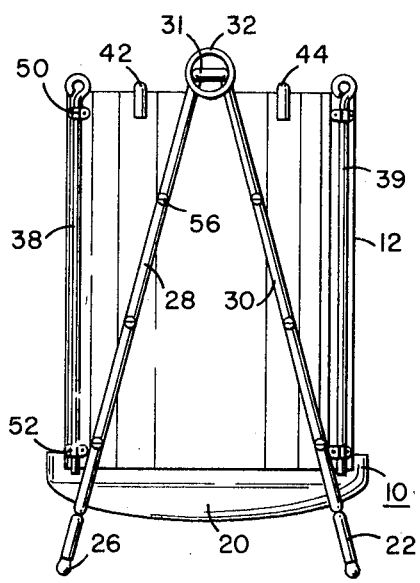
FIG. 2 is a side elevation view of the portable heating device illustrated in FIG. 1.
Figure 4:
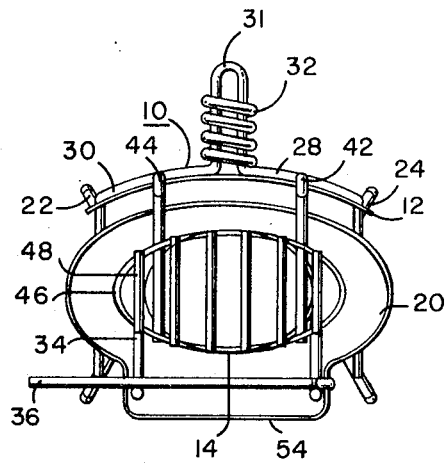
FIG. 4 is a top plan view of a portable heating device of this invention.

Referring now to the drawings, a portable heating device 10 has a lower tray 20 with a hollow inner volume that supports an open mesh fuel container 14. The mesh container 14 may comprise any suitable mesh, as for example a mesh constructed of iron, steel or other suitable or other suitable rod type material that is formed in a mesh as illustrated. The mesh container 14 has side support rods 16 and 18 for rigidity, all of which are secured to the inner bottom surface of the tray 20 in any suitable manner. The tray 20 is in turn supported on each side by U-shaped legs 22 and 24. Rod members 28 and 30 are secured between the U-shaped supports 22 and 24 and the tray structure 20, all of which are made of any suitable metal such as steel, and that are joined together by welding or the like. The rod members 28 and 30 have upward projecting portions that are bent and are joined together at a U-shaped end 31. Spiral wire like members 32 are secured to the bent portions forming a handle 32 form carrying the portable heating device 10. Suitable end covers 26 of rubber, plastic or other suitable material, protects the surface on which the portable heating device may be positioned. A shield 12, that may be made of stainless steel with reflecting surfaces, has a curved or concave shape as illustrated in FIG. 4 that is planner in its upward length. The shield 12 is secured to and supported by the upward projecting portions 28 and 30 by suitable screw connections 56. Known clasps 50 and 52 are mounted on the reverse side of the shield 12 for supporting skewers 38 and 39, that are used in the known manner on extended hook support members 34 that are secured in aligned positions to each of the side support rods 16 and 18 by welding or the like. The skewers 36 support food to be cooked in a position before the mesh container 14 and the reflective shield 12. A second cooking device 40 having an oval frame 46 with cross members 48 secured to the upper surface is attached to the upper edge of the shield 12 by hook members 42 and 44. It is to be noted that tray 20 has a forward extension 54 that projects outwardly and under the skewers 36 for catching drippings or the like that may fall from food thereon.

OPERATION

In operation, a suitable fuel (not shown), such as charcoal pieces or briquets, are placed in the mesh container 14 and ignited in any suitable known manner. The burning charcoal burns without giving off any smoke, as is well known. The heat waves, infra-red radiations and the like from the burning charcoal radiates out the front, sides, and rear of the container 14. These heat radiations that contact the concave reflecting surface of the shield 12 are reflected and radiated outwardly in a forward and angled direction over a relatively large area for the size of the portable heating device employed. While briquet charcoal fuel may be used, the more rough cut charcoal is preferred.

The skewers 36 in their mounted position on members 34 and the heating plate 40 take advantage not only of the heat directly radiated thereto from the charcoal burning in the mesh container 14 but also from the heat reflected from the shield 12.

It may be seen that the portable heating device may be moved by grasping the handle 32, which handle structure is shielded from the burning fuel by the shield 12. Since the entire structure is relatively light weight, the heating device may be selectively and easily moved as desired. The portable heating device in not requiring any connection to a fuel source and radiating heat in a forward horizontal direction, is particularly adapted for use in open air environments.

Having described my invention, I now claim:
1. A heating device comprising:
a tray having a substantially oval shape with raised sidewalls,
an open mesh container for receiving combustible materials positioned on said tray at substantially the center thereof and having a longitudinal length extending in an upward direction,
a shield having a reflecting surface positioned along the side of said container with the longitudinal length of said surface being parallel with said longitudinal length of said container,
the surface of said shield normal to said longitudinal length being concave in a direction toward said container,
said container is rigid and has a tubular shape with a substantially oval cross section of smaller size than said tray and with the lower end resting on said tray and the upper end being open,
said shield having a curvature substantially corresponding to the adjacent outer edge of said tray,
and the width of said shield being larger than the width of said container and smaller than the width of said tray.
2. A heating device as claimed in claim 1 in which:
a frame having supporting legs,
said tray being secured to said frame,
a handle member comprising a pair of rods secured at their lower ends to opposite sides of said frame and being connected together at their upper ends forming a gripping portion,
and said shield being secured to said handle member in a position between said gripping portion and said tray.
3. A heating device as claimed in claim 2 including:
at least a pair of spaced hook means secured to said container and projecting in a forward, aligned position for supporting a skewer in front of said container,
and the front portion of said tray projecting outwardly so that a substantial portion of the supported skewer is vertically over said tray.
4. A heating device comprising:
a tray,
an open mesh container for receiving combustible materials positioned on said tray and having a longitudinal length extending in an upward direction,
a shield having a reflecting surface positioned along the side of said container with the longitudinal length of said surface being parallel with said longitudinal length of said container,
the surface of said shield normal to said longitudinal length being concave in a direction toward said container,
said shield having a thin upper edge,
an open mesh tray having a pair of spaced members extending sidewardly therefrom,
and the ends of said members having ends aligned normal to said mesh tray for passing over said upper edge and supporting said mesh tray over said container.
5. A heating device as claimed in claim 4 in which:
said mesh tray is positioned by said spaced members directly above said container and below said upper edge of shield.
6. A heating device comprising:
a tray,
an open mesh container for receiving combustible materials positioned on said tray and having a longitudinal length extending in an upward direction with longitudinal sides that are open, through the mesh, entirely around the container,
a shield having a reflecting surface positioned along the side of and spaced from said container with the longitudinal length of said surface being parallel with said longitudinal length of said container,
and the surface of said shield normal to said longitudinal length being concave in a direction upward toward said container so that said reflective surface reflects heat received from ignited combustible materials in said container through said open mesh.
7. A heating device as claimed in claim 6 in which:
the side edges of said shield extend beyond the width of said container, and said concave surface reflects heat around and through said open mesh container.

8. A heating device as claimed in claim 6 including:
a frame having support legs,
said tray being secured to said frame,
elongated handle members secured to said frame and projecting upwardly,
and said shield being positioned between said handle member and said container.

9. A heating device as claimed in claim 8 in which:
said shield is secured to said handle member.

References Cited

UNITED STATES PATENTS

| | | | |
|---|---|---|---|
| 3,079,909 | 3/1963 | Bemben | 126—25 |
| 3,131,686 | 5/1964 | Budd | 126—25 |
| 3,175,549 | 3/1965 | Bergsten | 126—25 |
| 3,358,585 | 12/1967 | Scherer. | |

CHARLES J. MYHRE, Primary Examiner

U.S. Cl. X.R.

126—4, 62